(12) United States Patent
Akbari et al.

(10) Patent No.: US 12,540,362 B2
(45) Date of Patent: Feb. 3, 2026

(54) CELL BASED SHEAR STRESS SENSOR

(71) Applicant: Sartorius Stedim Biotech GmbH, Göttingen (DE)

(72) Inventors: Samin Akbari, Lincoln, MA (US); Ann-Cathrin Leroux, Neu-Ulm (DE); Taehong Kwon, Chestnut Hill, MA (US); Christoph Zehe, Ehingen (DE); David Pollard, Stow, MA (US)

(73) Assignee: Sartorius Stedim Biotech GmbH, Göttingen (DE)

( * ) Notice: Subject to any disclaimer, the term of this patent is extended or adjusted under 35 U.S.C. 154(b) by 496 days.

(21) Appl. No.: 17/747,589

(22) Filed: May 18, 2022

(65) Prior Publication Data

US 2023/0399705 A1   Dec. 14, 2023

(51) Int. Cl.
| | | |
|---|---|---|
| *C12Q 1/6897* | (2018.01) |
| *B01L 3/00* | (2006.01) |
| *C12M 1/34* | (2006.01) |
| *G01N 33/50* | (2006.01) |

(52) U.S. Cl.
CPC ...... *C12Q 1/6897* (2013.01); *B01L 3/502707* (2013.01); *C12M 41/46* (2013.01); *G01N 33/5005* (2013.01); *B01L 2200/06* (2013.01)

(58) Field of Classification Search
CPC ............. C12Q 1/6897; B01L 3/502707; B01L 2200/06; C12M 41/46; G01N 33/5005; C12N 2830/002; C12N 15/85; C12N 15/65
See application file for complete search history.

(56) References Cited

FOREIGN PATENT DOCUMENTS

| KR | 102382748 B1 | 2/2022 |
|---|---|---|
| WO | WO 2012/035120 A2 | 3/2012 |

OTHER PUBLICATIONS

Ehrengruber et al. (2000, Date Published: Nov. 27, 2000, Gene, https://doi.org/10.1016/S0378-1119(00)00445-5, examiner cited) (Year: 2000).*
Derouazi et al.(Available Online: Dec. 27, 2005, Biochemical and Biophysical Research Communication, www.elsevier.com/locate/ybbrc, examiner cited) {herein Derouazi}. (Year: 2005).*
Morgan (Date Published 2014, Plasmids 101: The Promoter Region—Let's Go!, https://blog.addgene.org/plasmids-101-the-promoter-region, examiner cited) {herein Morgan} (Year: 2014).*
Shemesh et al. (2015, Accepted: Aug. 22, 2015, Royal Society of Chemistry, DOI: 10.1039/c5lc00633c, examiner cited) {herein Shemesh). (Year: 2015).*
GenTarget (Date Available 2012 according to Wayback, EGR1 Promoter Pathway, examiner cited) {herein GenTarget}. (Year: 2012).*
Schwachtgen et al (Date Published Jun. 1998, examiner cited) {herein Schwachtgen} (Year: 1998).*
Wayback for GenTarget (Date Available 2012 according to Wayback, EGR1 Promoter Pathway, examiner cited) {herein GenTarget}. (Year: 2012).*
Zeh, N , et al., "Exploring synthetic biology for the development of a sensor cell line for automated bioprocess control", Scientific Reports 12 (2268), 11 pages (2022).
Extended European Search Report for EP Application No. 23171982.4 dated Nov. 16, 2023.
Khachigian et al., Egr-1 is activated in endothelial cells exposed to fluid shear stress and interacts with a novel shear-stress-response element in the PDGF A-chain promoter. Arterioscler Thromb Vasc Biol. Oct. 1997;17(10):2280-6. doi: 10.1161/01.atv.17.10.2280.
Schwachtgen et al., Fluid shear stress activation of egr-1 transcription in cultured human endothelial and epithelial cells is mediated via the extracellular signal-related kinase 1/2 mitogen-activated protein kinase pathway. J Clin Invest. Jun. 1, 1998;101(11):2540-9. doi: 10.1172/JCI1404.
Varma et al., A cell-based sensor of fluid shear stress for microfluidics. Lab Chip. Mar. 21, 2015;15(6):1563-73. doi: 10.1039/c4lc01369g.

* cited by examiner

*Primary Examiner* — Manjunath N Rao
*Assistant Examiner* — Erica Nicole Jones-Foster
(74) *Attorney, Agent, or Firm* — Wolf, Greenfield & Sacks, P.C.

(57) ABSTRACT

The present invention relates to isolated nucleic acid molecules, comprising a functional mammalian EGR-1 (early growth response protein 1) promoter region that is operatively linked to a gene encoding a fluorescent protein and controls expression of said gene. The present invention further relates to nucleic acid vectors, comprising said nucleic, cells comprising said nucleic acids or vectors, being capable of sensing and indicating fluid shear stress acting on themselves, and methods of generating the same. Furthermore, the present invention relates to methods of evaluating fluid shear stress acting on cells in real-time during the operation of a biotechnological device or system, methods of evaluating a biotechnological device or system with respect to fluid shear stress acting on cells caused by operation of said device or system, and methods of designing a biotechnological device or system, said methods using said cells.

20 Claims, 4 Drawing Sheets

CELL BASED SHEAR STRESS SENSOR

FIELD OF THE INVENTION

The present invention relates to isolated nucleic acid molecules, comprising a functional mammalian EGR-1 (early growth response protein 1) promoter region that is operatively linked to a gene encoding a fluorescent protein and controls expression of said gene. The present invention further relates to nucleic acid vectors, comprising said nucleic, cells comprising said nucleic acids or vectors, being capable of sensing and indicating fluid shear stress acting on themselves, and methods of generating the same. Furthermore, the present invention relates to methods of evaluating fluid shear stress acting on cells in real-time during the operation of a biotechnological device or system, methods of evaluating a biotechnological device or system with respect to fluid shear stress acting on cells caused by operation of said device or system, and methods of designing a biotechnological device or system, said methods using said cells.

BACKGROUND OF THE INVENTION

Biological and biotechnological application using live cells in one way or the other inherently require fluid handling and, thus, are prone to less-than-optimal performance due to fluid shear stress acting on said cells. Fluid shear stress can be caused by fluid shear, as well as bursting bubbles in a fluid, and can be responsible for all kinds of detrimental effects such as impaired cell growth and expansion, impaired cell health, increased cell damage and/or cell death, impaired cell productivity, and the like.

However, fluid shear stress applied to cells in respective bioprocesses, such as in bioreactors, is so far only poorly understood. The common practice to evaluate fluid shear stress is to perform computational flow dynamics to model the flow, which is challenging for a turbulent three-phase (air, media and cells) fluidic system. Further, assays assessing cell viability, cell morphology and/or cell growth can be employed to detect more severe physiological disturbances caused by fluid shear stress.

However, so far, no assay exists that could evaluate the effects of fluid shear stress acting on cells within the setting of a given biological or biotechnological application.

Therefore, a strong need exists to provide means for evaluating fluid shear stress acting on cells within a given biological or biotechnological application quantitively and in real-time.

This need is satisfied by providing the embodiments characterized in the claims.

SUMMARY OF THE INVENTION

The present invention relates to the following items:
1. An isolated nucleic acid molecule, comprising a functional mammalian EGR-1 (early growth response protein 1) promoter region that is operatively linked to a gene encoding a fluorescent protein and controls expression of said gene.
2. The isolated nucleic acid molecule according to item 1, wherein the EGR-1 promoter region is a human EGR-1 promoter region.
3. The isolated nucleic acid molecule according to item 1, wherein the EGR-1 promoter region is a murine EGR-1 promoter region.
4. The isolated nucleic acid molecule according to item 3, wherein the EGR-1 promoter region comprises the 527 base pairs of the native murine EGR-1 promoter upstream to its transcription start site.
5. The isolated nucleic acid molecule according to item 3, wherein the EGR-1 promoter region comprises the 425 base pairs of the native murine EGR-1 promoter upstream to its transcription start site.
6. The isolated nucleic acid molecule according to any one of items 1 to 5, wherein the fluorescent protein is selected from the group consisting of green fluorescent protein (GFP), derivatives of GFP, red fluorescent protein (RFP), and derivatives of RFP.
7. The isolated nucleic acid molecule according to item 6, wherein derivatives of GFP are selected from the group consisting of GFPmut2, and EGFP.
8. The isolated nucleic acid molecule according to item 6, wherein a derivative of RFP is TurboRFP.
9. A nucleic acid vector, comprising the nucleic acid according to any one of items 1 to 8.
10. A cell, comprising the nucleic acid according to any one of item 1 to 8.
11. The cell according to item 10, which is a CHO cell, a HEK cell, a T cell, a stem cell, or an endothelial cell.
12. The cell according to item 10, which is a CHO DG44 cell.
13. The cell according to item 10, which is a HEK293 cell.
14. A cell, comprising the vector according to item 9.
15. The cell according to item 14, which is a CHO cell, a HEK cell, a T cell, a stem cell, or an endothelial cell.
16. The cell according to item 14, which is a CHO DG44 cell.
17. The cell according to item 14, which is a HEK293 cell.
18. A method of generating a cell that is capable of indicating fluid shear stress acting on said cell, comprising the step of transfecting a cell with the nucleic acid according to any one of items 1 to 8.
19. The method according to item 18, wherein the cell is a CHO cell, a HEK cell, a T cell, a stem cell, or an endothelial cell.
20. The method according to item 18, wherein the cell is a CHO DG44 cell.
21. The method according to item 18, wherein the cell is a HEK293 cell.
22. A method of generating a cell that is capable of indicating fluid shear stress acting on said cell, comprising the step of transfecting a cell with the vector according to item 9.
23. The method according to item 22, wherein the cell is a CHO cell, a HEK cell, a T cell, a stem cell, or an endothelial cell.
24. The method according to item 22, wherein the cell is a CHO DG44 cell.
25. The method according to item 22, wherein the cell is a HEK293 cell.
26. A method of evaluating fluid shear stress acting on cells in real-time during the operation of a biotechnological device or system, comprising the steps of:
   (a) subjecting a cell according to any one of items 10 to 17 to operation of said biotechnological device or system,
   (b) determining a level of fluid shear stress acting on cells during operation of said biotechnological device or system using said cell in real-time at any given time, and
   (c) determining said level of fluid shear stress as the level of fluid shear stress that is acting on any cells subjected to operation of said biotechnological device or system at said given time.

27. A method of evaluating a biotechnological device or system with respect to fluid shear stress acting on cells caused by operation of said biotechnological device or system, comprising the steps of:
   (a) providing a biotechnological device or system,
   (b) subjecting a cell according to any one of items 10 to 17 to operation of said biotechnological device or system,
   (c) determining a level of fluid shear stress acting on cells during operation of said biotechnological device or system using said cell, and
   (d) in case the level of fluid shear stress determined in step (c) is higher than a predetermined acceptable level of fluid shear stress, evaluating said biotechnological device or system as unfavorable with respect to fluid shear stress acting on cells, and in case the level of fluid shear stress determined in step (c) is lower than said predetermined acceptable level of fluid shear stress, evaluating said biotechnological device or system as favorable with respect to fluid shear stress acting on cells.

28. A method of designing a biotechnological device or system, comprising the steps of:
   (a) providing a candidate biotechnological device or system,
   (b) subjecting a cell according to any one of items 10 to 17 to operation of said candidate biotechnological device or system,
   (c) determining a level of fluid shear stress acting on cells during operation of said candidate biotechnological device or system using said cell, and
   (d) in case the level of fluid shear stress is higher than a predetermined acceptable level of fluid shear stress, modifying the design of the candidate biotechnological device or system and repeating steps (a) to (d) until the level of fluid shear stress determined in step (c) is lower than said predetermined acceptable level of fluid shear stress, wherein upon each repetition of steps (a) to (d), the new candidate biotechnological device or system used in step (a) uses the previously modified biotechnological device or system design.

DETAILED DESCRIPTION OF THE INVENTION

In a first aspect, the present invention relates to an isolated nucleic acid molecule, preferably an isolated DNA molecule, comprising a functional mammalian EGR-1 (early growth response protein 1) promoter region, preferably a functional human or murine EGR-1 promoter region, that is operatively linked to a gene encoding a fluorescent protein and controls expression of said gene.

EGR-1 is a mammalian transcription factor that functions as a transcriptional regulator. The expression of EGR-1 is controlled by the EGR-1 promoter which is responsive to various stimuli, including various forms of cell stress. As used herein, the term "functional EGR-1 promoter region" refers to any EGR-1 promoter regions that are capable of (i) being activated by such stimuli and (ii) initiating transcription of the gene downstream of the promoter upon such activation. Likewise, the term "operatively linked to a gene" refers to the same capability of initiating transcription of said gene upon activation of the promoter region.

In specific embodiments, the EGR-1 promoter region comprises the 527 base pairs of the native murine EGR-1 promoter upstream to its transcription start site. In another specific embodiment, the EGR-1 promoter region comprises the 425 base pairs of the native murine EGR-1 promoter upstream to its transcription start site.

Fluorescent proteins that can be used in the context of the present invention are not particularly limited and are known in the art. In specific embodiments, the fluorescent protein is selected from the group consisting of green fluorescent protein (GFP), derivatives of GFP (such as GFPmut2, EGFP (Enhanced GFP)), red fluorescent protein (RFP), and derivatives of RFP (such as TurboRFP).

In a second aspect, the present invention relates to a nucleic acid vector, comprising the nucleic acid according to the present invention. Respective vectors are not particularly limited and are known in the art. They include for example suitable expression vectors known in the art. Nucleic acid vectors according to the present invention can comprise additional genetic elements such as genes encoding one or more selection markers, polyadenylation signal sequences, and enhancers, as known in the art.

In a third aspect, the present invention relates to a cell, comprising the nucleic acid according to the present invention, or the nucleic acid vector according to the present invention. Respective cells function as a sensor of fluid shear stress, i.e., they are capable of indicating fluid shear stress acting upon them. Specifically, upon fluid shear stress acting on said cells, the EGR-1 promoter region is activated and initiates transcription of the gene encoding the fluorescent protein, resulting in the expression of said fluorescent protein which can be detected by suitable means for the detection of fluorescence known in the art.

Suitable cell types that can be used according to the present invention are not particularly limited and include any cells that might be of interest in this respect. In specific embodiments, the cell is a CHO (Chinese hamster ovary) cell (e.g. a CHO DG44 cell), a HEK (human embryo kidney) cell (e.g. a HEK293 cell), a T cell, a stem cell, or an endothelial cell.

Means of transfecting a given cell with the nucleic acid or nucleic acid vector of the present invention are not particularly limited and are known in the art.

In a fourth aspect, the present invention relates to a method of generating a cell that is capable of indicating fluid shear stress acting on said cell, comprising the step of transfecting a cell with the nucleic acid according to the present invention, or with the nucleic acid vector according to the present invention.

In this aspect, the cell is as defined for the third aspect of the present invention. Further, as indicated above, means of transfecting a given cell with the nucleic acid or nucleic acid vector of the present invention are not particularly limited and are known in the art.

In a fifth aspect, the present invention relates to a method of evaluating fluid shear stress acting on cells in real-time during the operation of a biotechnological device or system, comprising the steps of:
(a) subjecting a cell according to the present invention to operation of said biotechnological device or system,
(b) determining a level of fluid shear stress acting on cells during operation of said biotechnological device or system using said cell in real-time at any given time, and
(c) determining said level of fluid shear stress as the level of fluid shear stress that is acting on any cells subjected to operation of said biotechnological device or system at said given time.

As used herein the term "in real-time" refers to the fact that according to the above method, fluid shear stress acting on cells during operation of the biotechnological device or system can be detected and evaluated while operation of the biotechnological device or system is ongoing. Further, as used herein, the term "biotechnological device or system" relates to any devices or systems that employ or act on living cells in any way or form at least at some time during their intended operation. By way of example, respective biotechnological devices include bioreactors, microfluidic devices and systems, flow cytometry devices and systems, cell culture devices, cell culture devices and systems, cell manipulation devices and systems, cell analysis devices and systems and the like, as known in the art.

The term "subjecting a cell to operation of said biotechnological device or system" refers to any use of the cells of the present invention in the context of the intended operation of said device or system. This can be an exclusive use of the cells of the present invention, or a combined use together with cells of interest in the context of the intended operation of the device or system. In case of the latter, the combined use can be in the form of mixing the cells of the present invention with the cells of interest, or in the form of a separate use of the cells of the present invention during the intended operation of the device or system, e.g. in a suitable culture vessel or live cell imaging device, provided that the cells of the present invention are subjected to the same potential fluid shear stress as the cells of interest.

As used herein, the term "determining a level of fluid shear stress acting on cells during operation of said biotechnological device or system using said cell" refers to the measurement of fluorescence signal emitted by the fluorescent protein potentially expressed by the cells of the present invention and correlating the same to an amount of fluid shear stress. As indicated above, respective means of detecting/measuring fluorescence are not particularly limited and are known in the art.

In a related sixth aspect, the present invention relates to a method of evaluating a biotechnological device or system with respect to fluid shear stress acting on cells caused by operation of said biotechnological device or system, comprising the steps of:
(a) providing a biotechnological device or system,
(b) subjecting a cell according to the present invention to operation of said biotechnological device or system,
(c) determining a level of fluid shear stress acting on cells during operation of said biotechnological device or system using said cell, and
(d) in case the level of fluid shear stress determined in step (c) is higher than a predetermined acceptable level of fluid shear stress, evaluating said biotechnological device or system as unfavorable with respect to fluid shear stress acting on cells, and in case the level of fluid shear stress determined in step (c) is lower than said predetermined acceptable level of fluid shear stress, evaluating said biotechnological device or system as favorable with respect to fluid shear stress acting on cells.

In this aspect, all definitions for the method according to the fifth aspect of the present invention equally apply.

In a related seventh aspect, the present invention relates to a method of designing a biotechnological device or system, comprising the steps of:
(a) providing a candidate biotechnological device or system,
(b) subjecting a cell according to any one of items 10 to 17 to operation of said candidate biotechnological device or system,
(c) determining a level of fluid shear stress acting on cells during operation of said candidate biotechnological device or system using said cell, and
(d) in case the level of fluid shear stress is higher than a predetermined acceptable level of fluid shear stress, modifying the design of the candidate biotechnological device or system and repeating steps (a) to (d) until the level of fluid shear stress determined in step (c) is lower than said predetermined acceptable level of fluid shear stress, wherein upon each repetition of steps (a) to (d), the new candidate biotechnological device or system used in step (a) uses the previously modified biotechnological device or system design.

In this aspect, all definitions for the method according to the fifth aspect of the present invention equally apply.

As used herein, the term "candidate biotechnological device or system" refers to a biotechnological device or system according to a proposed design. In step (d) of the above method, this design is either accepted as the final design of the biotechnological device or system, in case the level of fluid shear stress determined in step (c) is below an acceptable level, or the design is modified in a way that is potentially alleviating fluid shear stress during operation of the device or system, in case the level of fluid shear stress determined in step (c) is above an acceptable level. This modified biotechnological device or system is then subjected to a new round of analysis according to the above method.

The present invention uses genetically modified cells that respond to shear stress in the form of expressing fluorescent proteins. Cells that experience higher magnitude or duration of shear stress will generate a higher signal that can be quantified. Thus, the present invention provides a useful tool to characterize the true shear stress applied to cells in bioprocesses including bioreactors, tubing, pumps, etc., as well as in the evaluation, characterization and design of new biotechnological devices or systems and bioprocessing equipment.

The cell-based sensors of the present invention advantageously report the true impact by the whole shear stress acting on said cells, thus indicating what cells feel like and go through due to the combination of shear stresses.

The present invention will be further illustrated in the following examples without any limitation thereto.

EXAMPLES

Material and Methods

Cell Culture in Shake Flasks

CHO DG44 cells expressing GFP under control of stress-inducible EGR-1 were cultured in media composed of Cellca SMD (#72739C, SAFC, Merck KGaA, Darmstadt, Germany), 6 mM L-Glutamine (Corning, NY, USA), 15 nM MTX (Pfizer Pharma, PZN-3362608) and 250 µg/mL G418 (Gibco, 10131027). Cells were cultivated by standard method, briefly, $1\times10^7$ cells were dispersed in 50 mL media to achieve inoculation concentration of $2\times10^5$ cells/mL in a 250 mL shake flask (4115-0250, Erlenmeyer flask, Thermo Scientific). Cells were incubated at 36.8° C. with 7.5% $CO_2$ supplement and an orbital shaking at 103 RPM and passaged every 3 days.

Sensor Characterization—Chemical (PMA) Induced Stress

Chemical-induced stress was studied using Phorbol 12-myristate 13-acetate (PMA, Sigma, P1585-1MG) and measured by Incucyte (Sartorius) and flow cytometer (Cyto-FLEX, Beckman Coulter). PMA was dissolved in DMSO to make a stock solution of 0.5 mg/mL. For Incucyte measurements, cells ($1\times10^4$ cells/well) were seeded in a 96 well plate. PMA was added after 3 h of seeding to achieve final concentration of 0, 10, 100, 250, and 500 ng/mL in the wells. Upon addition of PMA, the plate was scanned (4 images per well) under GFP mode with 10× objective every 1 h for 3 days. Exposure time was set to be 100 ms. Mean GFP fluorescent intensity of each cell were obtained by integrated GFP intensity normalization by cell area per image. For flow cytometer measurements, cells ($2\times10^5$ cells/well) were seeded in 24 well plate. Cell concentration reached $5\times10^5$ cells/mL after 3 days of cultivation. PMA were added subsequently to achieve final concentration of 0, 10, 100, 250, and 500 ng/mL in the wells. After 24 h, cells were collected by centrifugation (190 g, 3 min), washed 3 times with PBS and dispersed in PBS to measure GFP intensity by flow cytometry.

Sensor Characterization—Fluid Shear tress

Commercial microfluidic chips (µ-Slide VI 0.4, 80604, ibidi; height 400 um, width 3.8 mm, length 17 mm) were used to apply fluidic shear stress to the CHO cells. The channel surface had poly-L-Lysine for cell attachment. 30 µL of CHO cells at $0.75\times10^6$ cells/mL were seeded to the microfluidic channel and incubated in the 7.5% $CO_2$ incubator for 60 min for cell attachment. Subsequently, the tubes from the medium reservoirs were connected to the microfluidic channel through Luer-lock connection in a sterile manner. Then, the pressure pump (PG-MFC-BCH, PreciGenome) gave an oscillatory flow to the microfluidic channel at a target flow rate; the flow rate was controlled by varying pressures. The fluidic shear stress on the cells in the channel was calculated according to the following equation:

$$\tau = \eta \cdot 176.1 \cdot \Phi$$

with $\tau$ shear stress (dyn/cm$^2$), $\eta$ dynamic viscosity (dyn·s/cm$^2$), and $\Phi$ flow rate (mL/min). The dynamic viscosity of culture medium was assumed to have 0.0068 dyn·s/cm$^2$ (water at 37° C.). Following shear stress application at different magnitudes (0, 8.0, 12.9, and 21.9 dyn/cm$^2$) and duration (10, 30, and 60 min), the culture medium reservoirs were disconnected from the microfluidic chip. The microfluidic chips were then placed on a tray in the live cell imaging and analysis instrument (Incucyte®, Sartorius) in the 7.5% $CO_2$ incubator. The instrument captured phase contrast and fluorescent images at a regular time interval (60 min) and analyzed them automatically (cells and signal intensity). For quantification of cellular shear-stress response, the green fluorescence of the cells at 24 hours after shear stress application was averaged and normalized by the fluorescence of the cells in the no-flow (i.e., no shear stress) channels.

Sensor Test in Ambr Bioreactors

Two different types of commercial bioreactors (Ambr® 250, Sartorius) were tested: vessel A (001-2A23, baffled vessel, two impellers, 26 mm impeller diameter, Sartorius) and vessel B (001-2A33, unbaffled vessel, one impeller, 30 mm impeller size, Sartorius). The power number of the impeller for two vessels was 1.34 and 2.07, respectively. Other culture flasks (4115-0250, Erlenmeyer flask, Thermo Scientific; 658195, Suspension culture flask, greiner) were used as controls. The shear-responsive cells were cultured in shake flasks in a 7.5% $CO_2$ incubator on a batch mode (see Cell culture section above). After 3-day cultivation, the cells were inoculated into Ambr bioreactors (vessel A and B) at $0.3\times10^6$ cells/mL (viability: >98%). The working volume of the bioreactor was 120 to 165 mL. The bioreactor medium consisted of SMD, L-Glutamine (6 mM), MTX (15 nM), and G418 (250 µg/mL). Feed A, Feed B, and Anti-Foam C (2 v/v %), concentrated glucose (400 g/L; 97062-946, VWR) were prepared in separate reservoirs, which were connected to the bioreactor. The pH and DO were set to 7.1 and 60%, respectively. They were automatically controlled by an Ambr station (Ambr 250 modular, Sartorius) with gases ($O_2$, $N_2$, and $CO_2$). Temperature was set to 36.8° C. Different agitation RPMs (1000, 1500, 2000, and 2500) were applied to the bioreactors. The agitation power per unit volume (P/V, W/m$^3$; power density) was calculated as follows:

$$\frac{P}{V} = \frac{(N_p \times \rho \times N^3 \times D^5)}{V}$$

with $N_p$ impeller power number, $\rho$ fluid density (kg/m$^3$), N agitator speed (RPS), D impeller outer diameter (m), and V the bioreactor's working volume (m$^3$). The other control flasks were placed on a shaker (Dura-Shaker, VWR) and agitated at 108 speed. The culture samples from Ambr 250 bioreactors and control flasks were taken at different time points (0 hr, 4 hr, 1 day, 3 days, and 5 days). After cell concentration was counted by the automated cell culture analyzer (Cedex HiRes Analyzer, Roche), the sampled cells were seeded into the 96 well plate at $0.04\times10^6$ cells/mL concentration (volume: 150 µL). Subsequently, the plate was placed in Incucyte in the incubator, and fluorescent shear response of the cells was automatically monitored at a regular time interval (60 min). For quantification of cellular shear response, the fluorescence signal at 24 hours after seeding was used. The mean fluorescence intensity of the cells sampled from the bioreactors was normalized by the intensity of the cells from the control flasks.

Example 1

Sensor Characterization—PMA Induced Stress

Figure 1:
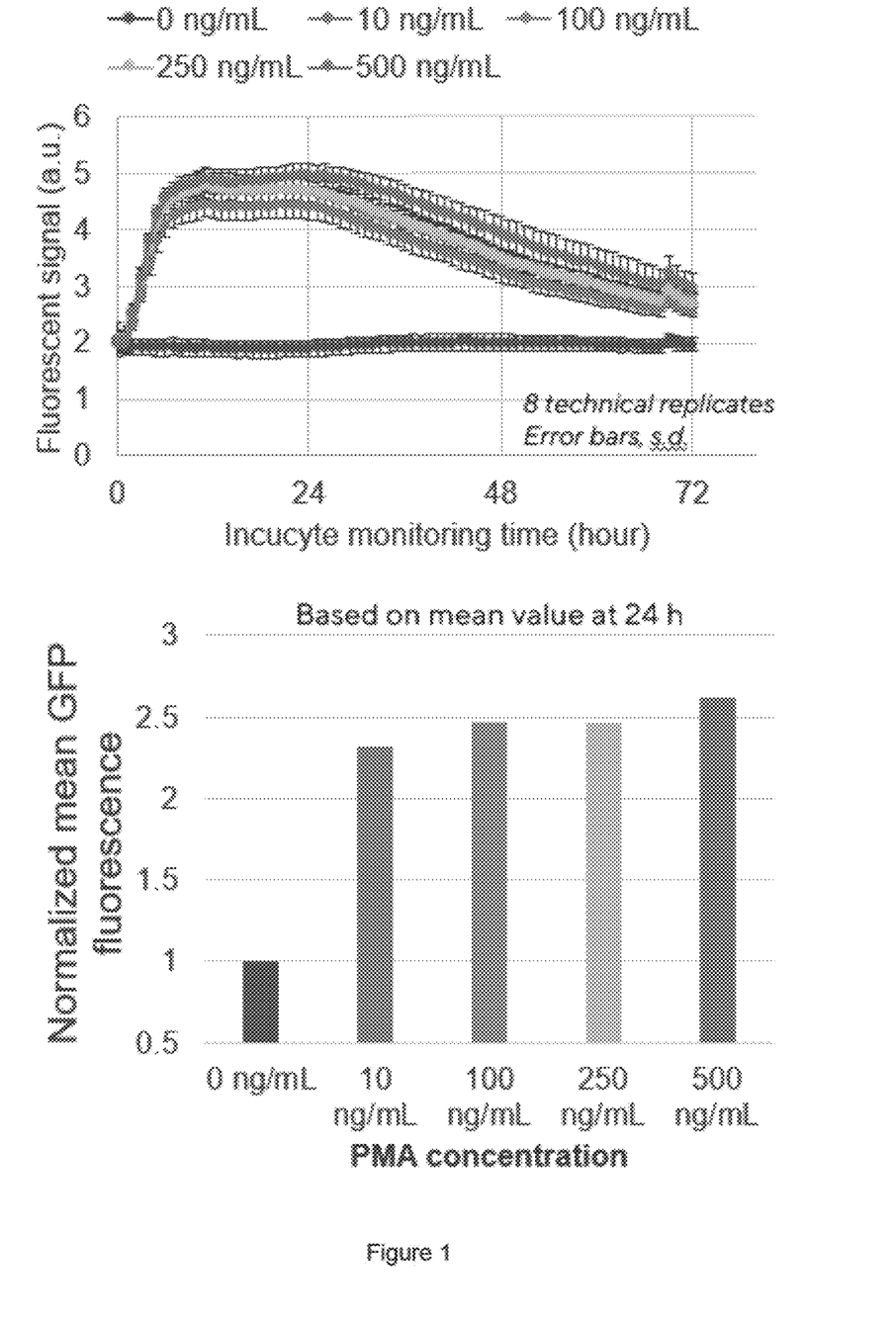
FIG. 1:
GFP fluorescence of the cells, measured by Incucyte (Live cell imaging and analysis instrument, Sartorius). Phorbol 12-myristate 13-acetate (PMA) at different concentrations was used to induce cellular stress.

GFP fluorescence measured by Incucyte is shown in FIG. 1. 0 ng/mL PMA only shows basal GFP fluorescence intensity in the full recording course (72 h). 10 ng/mL PMA induces lower level of increased GFP fluorescence intensity compared with 100 ng/mL, 250 ng/mL and 500 ng/mL PMA. GFP fluorescence intensity increases and plateaus in the first 10 h and decreases from 24 h after PMA addition. Fold GFP fluorescence intensity change normalized with 0 ng/mL PMA at 24 h was 2.32, 2.46, 2.47, 2.61 for 10, 100, 250, 500 ng/mL PMA, respectively.

GFP fluorescence measured by flow cytometer showed that percent of activated cells were 2.79%, 7.83%, 18.55%, 19.65% and 21% for 0, 10, 100, 250, 500 ng/mL PMA, respectively. Fold GFP fluorescence intensity change normalized with 0 ng/mL PMA was 1.78, 2.17, 2.86, 2.74 for 10, 100, 250, 500 ng/mL PMA, respectively.

Example 2

Sensor Characterization—Fluid Shear Stress (Microfluidic Chip+Incucyte)

Figure 2:
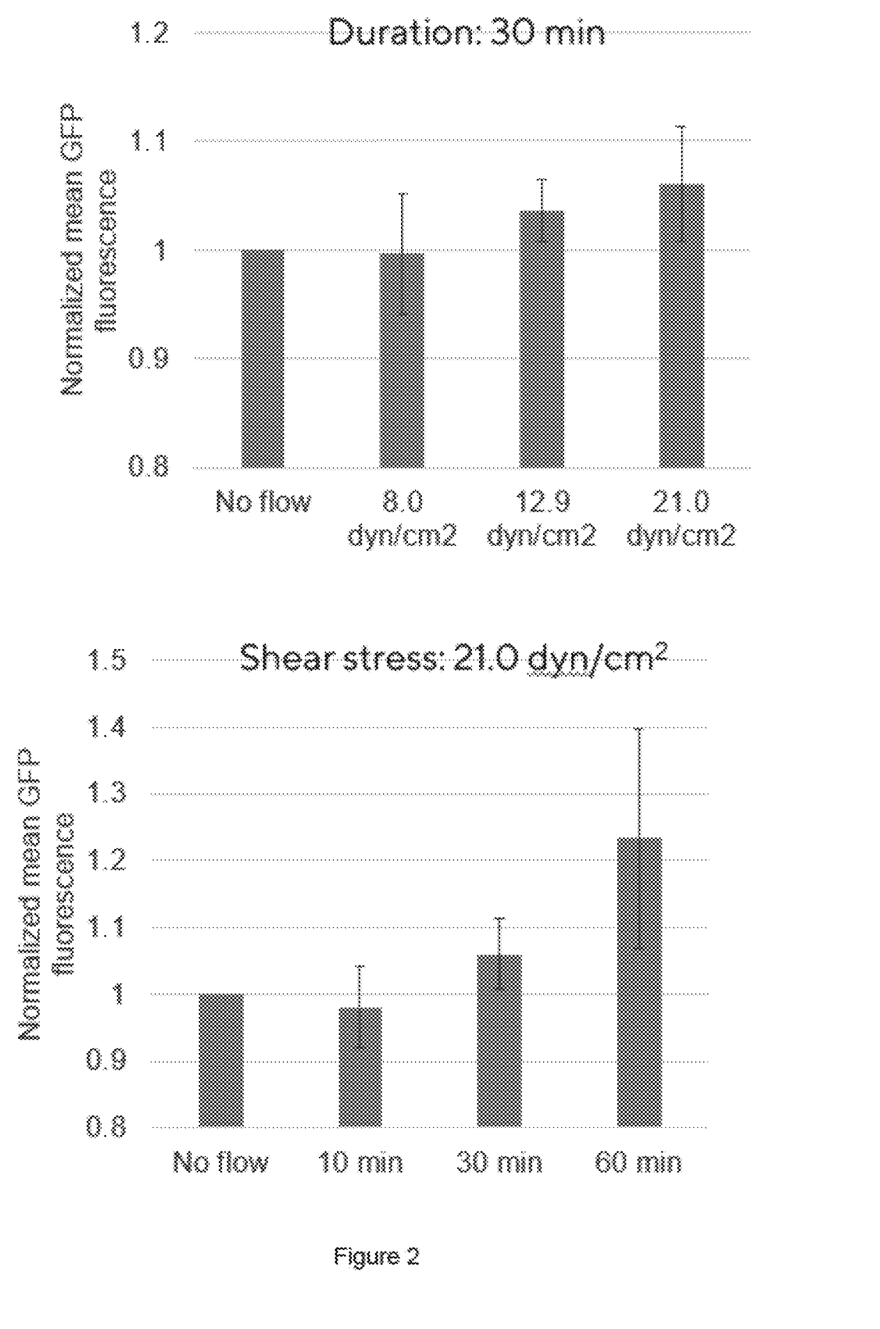
FIG. 2:
Shear stress response at different magnitudes and durations.

Fluidic shear stress was applied to the cells in the microfluidic channels. The cells were under oscillatory flow at different magnitudes and durations. FIG. 2 shows the shear stress response at different magnitudes (8.0, 12.9, and 21.0 dyn/cm$^2$) at a fixed duration (30 min). The fluorescence level of the cells at the lowest shear stress 8.0 dyn/cm$^2$ was similar to the no-flow (i.e., no shear stress) control. However, further increase in stress magnitude to 12.9 and 21.0 dyn/cm$^2$ had higher fluorescence. The shear stress level 21.0 dyn/cm$^2$ produced the highest fluorescence. Increase in mean fluorescence was 6%.

In addition to stress magnitude, different durations of shear stress were tested. The shear stress level was fixed to 21.0 dyn/cm$^2$. Compared to the cells in no-shear-stress channels, the normalized shear stress levels of three different durations were 0.98, 1.06, and 1.23, respectively. The longer duration of shear stress application caused more fluorescent responses from the cells.

Example 3

Sensor Test in Ambr Reactors

Figure 3:
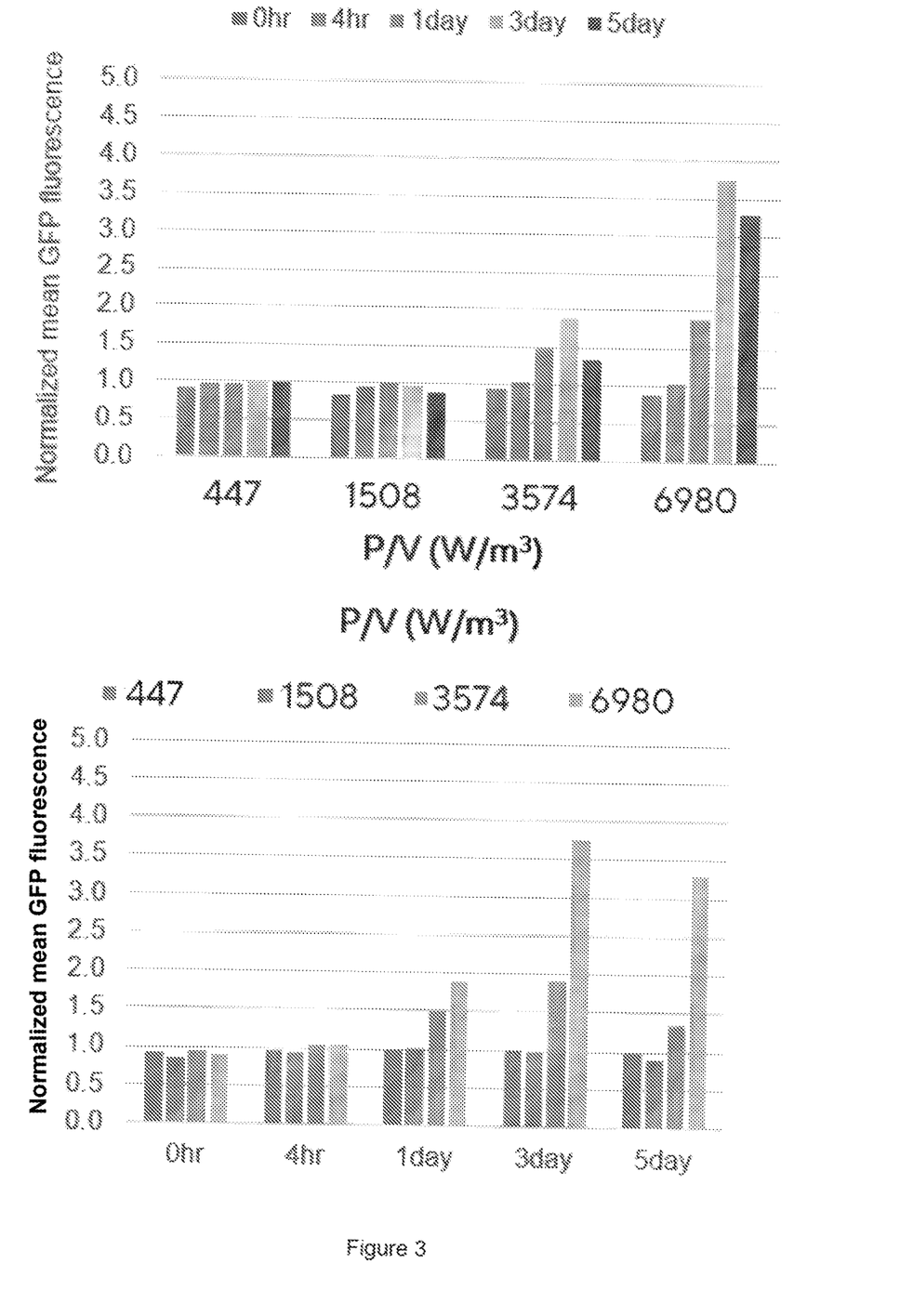
FIG. 3:
Shear response of cells in a commercial small-scale bioreactor at different power densities and culture durations. Stirring speed was varied to change power density.

The shear response of the cells was tested in a commercial small-scale bioreactor ("vessel A", power number 1.34, baffled, two impellers, impeller outer diameter 26 mm). By varying stirring speeds, different power densities (power per unit volume; P/V in W/m$^3$) were obtained. Four power densities (447, 1508, 3574, and 6980 W/m$^3$) were tested at different culture durations (0 hr, 4 hr, 1 day, 3 days, and 5 days), as shown in FIG. 3. The power densities of 447 and 1508 did not increase shear stress response regardless of culture duration. However, the increase in cellular response was observed starting 3574 W/m$^3$ and after 24-hour cultivation. The higher power density (6980 W/m$^3$) produced more response of the cells.

Figure 4:
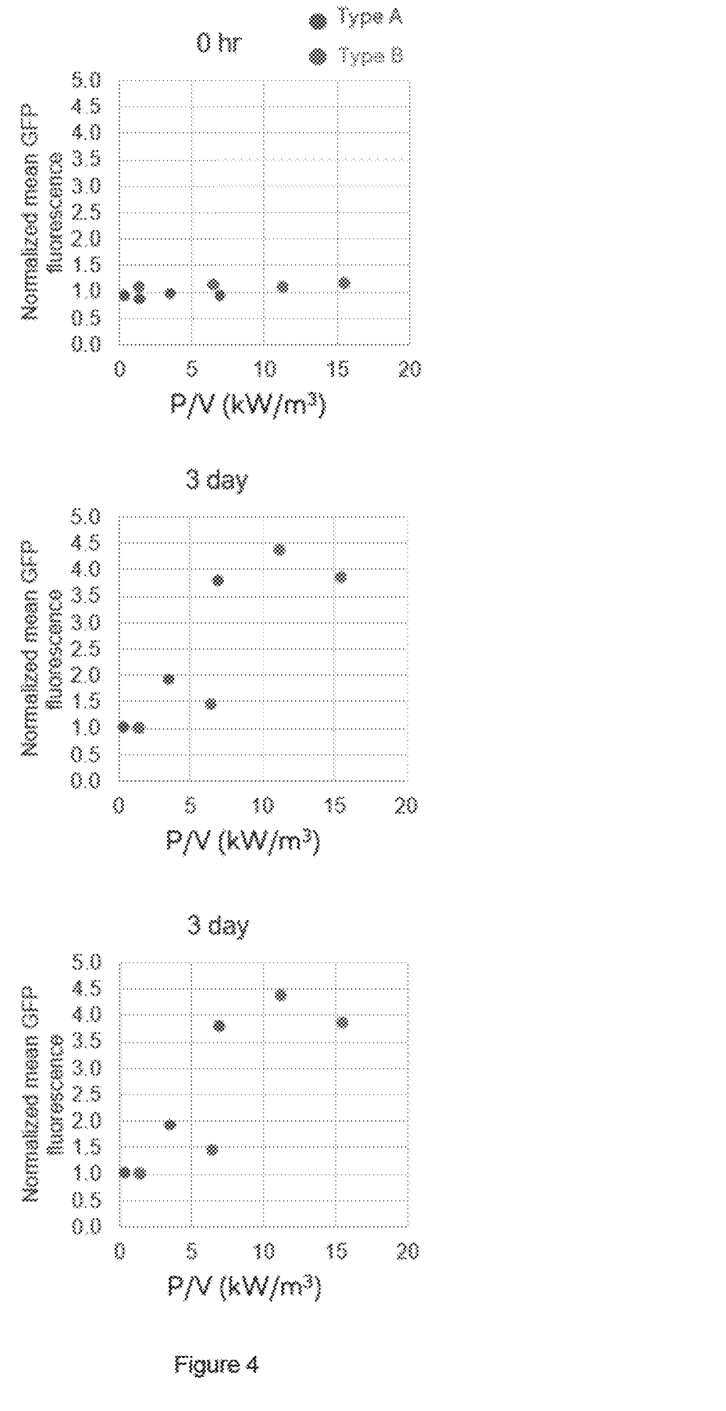
FIG. 4:
Cellular shear stress response in two different bioreactors (vessel A and B) at different power densities and culture durations.

The cell-based shear stress sensor can be applied to other bioreactors for comparison of shear stress levels in different bioreactors. The cells were cultured in another bioreactor vessel with different impellers ("Vessel B", power number 2.07, unbaffled, one impeller, impeller outer diameter 30 mm). FIG. 4 shows the cellular response in two different bioreactors (vessel A and B) at different power densities and culture durations. Different bioreactor conditions and impeller structure produced different power densities. Compared to 0 hr, both vessel A and B bioreactors during 1-day cultivation exhibited the increase in shear stress response at higher P/V. Vessel A bioreactor had 1.5 response at 3574 P/V; Vessel B bioreactor had 1.33 response at 6550 P/V. Higher signal intensity (1.89) of vessel A than vessel B (1.33) in a similar P/V range (6550 to 6980 W/m$^3$) indicates vessel A caused more shear stress on the cells than vessel B. 3-day cultivation further supports this. At a similar P/V (6550 to 6980 W/m$^3$), vessel B had smaller shear stress response than vessel A (2.62-fold difference). As P/V increased further above 10 kW/m$^3$, the vessel B bioreactor showed a similar high shear stress response to vessel A at 1-day and 3-day cultivation, indicating that cultivation in two bioreactors at this agitation condition is not suitable for cell cultivation.

The invention claimed is:

1. A method of evaluating fluid shear stress acting on cells in real-time during the operation of a biotechnological device or system, wherein the biotechnological device or system comprises a bioreactor, wherein the bioreactor comprises a vessel and an impeller, and wherein the method comprises the steps of: (a) subjecting a sample comprising said cells to said operation of said biotechnological device or system, wherein said cells comprise an isolated nucleic acid molecule or a nucleic acid vector comprising said isolated nucleic acid molecule, and wherein said isolated nucleic acid molecule comprises a functional mammalian EGR-1 (early growth response protein 1) promoter region that is operatively linked to a gene encoding a fluorescent protein and controls expression of said gene;
(b) measuring an intensity of a fluorescence signal emitted by the fluorescent protein in the sample of said cells; (c) measuring an intensity of a fluorescence signal emitted by the fluorescent protein in a control comprising said cells but not subjected to the operation of the biotechnological device or system; and (d) determining a level of fluid shear stress acting on said cells during operation of said biotechnological device or system in real-time by normalizing the intensity of the fluorescence signal measured in step (b) by the intensity of the fluorescence signal measured in step (c).

2. A method of evaluating a biotechnological device or system with respect to fluid shear stress acting on cells caused by operation of said biotechnological device or system, comprising the steps of: (a) providing a biotechnological device or system, (b) subjecting a sample comprising said cells to operation of said biotechnological device or system, wherein said cells comprise an isolated nucleic acid molecule or a nucleic acid vector comprising said isolated nucleic acid molecule, and wherein said isolated nucleic acid molecule comprises a functional mammalian EGR-1 (early growth response protein 1) promoter region that is operatively linked to a gene encoding a fluorescent protein and controls expression of said gene; (c) measuring an intensity of a fluorescence signal emitted by the fluorescent protein in the sample of said cells; (d) measuring an intensity of a fluorescence signal emitted by the fluorescent protein in a control comprising said cells but not subjected to the operation of the biotechnological device or system; (e) determining a level of fluid shear stress acting on said cells during operation of said biotechnological device or system by normalizing the intensity of the fluorescence signal measured in step (c) by the intensity of the fluorescence signal measured in step (d); and (f) determining whether the biotechnological device or system applies an acceptable level of fluid shear stress to said cells based on whether the level of fluid shear stress determined in step (e) is below a predetermined level of fluid shear stress.

3. A method of designing a biotechnological device or system, comprising the steps of: (a) providing a candidate biotechnological device or system, (b) subjecting a sample comprising cells to operation of said candidate biotechnological device or system, wherein said cells comprise an isolated nucleic acid molecule or a nucleic acid vector comprising said isolated nucleic acid molecule, and wherein said isolated nucleic acid molecule comprises a functional mammalian EGR-1 (early growth response protein 1) promoter region that is operatively linked to a gene encoding a fluorescent protein and controls expression of said gene; (c) measuring an intensity of a fluorescence signal emitted by the fluorescent protein in the sample of said cells; (d) measuring an intensity of a fluorescence signal emitted by the fluorescent protein in a control comprising said cells but not subjected to the operation of the biotechnological device or system; (e) determining a level of fluid shear stress acting on cells during operation of said candidate biotechnological device or system by normalizing the intensity of the fluorescence signal measured in step (c) by the intensity of the fluorescence signal measured in step (d); (f) determining whether the level of fluid shear stress acting on said cells during operation of said candidate biotechnological device or system is higher than a predetermined level of fluid shear stress, (g) based on the determination of step (f), either: (i) accepting the design of the biotechnological device or system as the final design of the biotechnological device or system, or (ii) modifying the design of the candidate biotechnological device or system to apply less shear stress to cells and repeating steps (a) to (e) until the level of fluid shear stress determined in step (c) is lower than said predetermined level of fluid shear stress, wherein upon each repetition of steps (a) to (e), the candidate biotechnological device or system used in step (a) uses the previously modified biotechnological device or system design.

4. The method according to claim 1, wherein the EGR-1 promoter region is a human EGR-1 promoter region or a murine EGR-1 promoter region.

5. The method according to claim 4, wherein the EGR-1 promoter region comprises 527 base pairs of the native murine EGR-1 promoter upstream to its transcription start site, or 425 base pairs of the native murine EGR-1 promoter upstream to its transcription start site.

6. The method according to claim 1, wherein the fluorescent protein is selected from the group consisting of green fluorescent protein (GFP), and red fluorescent protein (RFP).

7. The method according to claim 1, wherein the cell is a CHO cell, a HEK cell, a T cell, a stem cell, or an endothelial cell.

8. The method according to claim 7, wherein the cell is a CHO DG44 cell or a HEK293 cell.

9. The method according to claim 1, wherein the cell is a CHO DG44 cell comprising said nucleic acid vector comprising said nucleic acid molecule, and wherein the fluorescent protein is GFP.

10. The method according to claim 1, wherein said biotechnological device or system further comprises tubing and/or pumps.

11. The method according to claim 2, wherein the EGR-1 promoter region is a human EGR-1 promoter region or a murine EGR-1 promoter region.

12. The method according to claim 11, wherein the EGR-1 promoter region comprises the 527 base pairs of the native murine EGR-1 promoter upstream to its transcription start site, or the 425 base pairs of the native murine EGR-1 promoter upstream to its transcription start site.

13. The method according to claim 2, wherein the fluorescent protein is selected from the group consisting of green fluorescent protein (GFP) and red fluorescent protein (RFP).

14. The method according to claim 2, wherein the cell is a CHO cell, a HEK cell, a T cell, a stem cell, or an endothelial cell.

15. The method according to claim 2, wherein the cell is a CHO DG44 cell comprising said nucleic acid vector comprising said nucleic acid molecule, and wherein the fluorescent protein is GFP.

16. The method according to claim 3, wherein the EGR-1 promoter region is a human EGR-1 promoter region or a murine EGR-1 promoter region.

17. The method according to claim 16, wherein the EGR-1 promoter region further comprises 527 base pairs of the native murine EGR-1 promoter upstream to its transcription start site, or 425 base pairs of the native murine EGR-1 promoter upstream to its transcription start site.

18. The method according to claim 3, wherein the fluorescent protein is selected from the group consisting of green fluorescent protein (GFP) and red fluorescent protein (RFP).

19. The method according to claim 3, wherein the cell is a CHO DG44 cell comprising a nucleic acid vector comprising said nucleic acid molecule, and wherein the fluorescent protein is GFP.

20. The method according to claim 1, wherein the vessel has a volume of greater than or equal to 120 mL.

* * * * *